United States Patent Office 3,701,739
Patented Oct. 31, 1972

3,701,739
METHOD FOR FORMING MIXED OXIDE HETEROGENOUS CATALYSTS
Bennett Bovarnick, Newton Centre, Robert E, Eberts, Framingham, and Ravindra Nadkarni, Cambridge, Mass., assignors to Arthur D. Little, Inc., Cambridge, Mass.
No Drawing. Filed Dec. 14, 1970, Ser. No. 98,008
Int. Cl. B01j 11/06, 11/22
U.S. Cl. 252—454               18 Claims

ABSTRACT OF THE DISCLOSURE

A heterogenous catalyst is formed by decomposing and partially dehydrating an ammoniacal solution of a mixture of the carbonate or hydroxide of at least one metal which is reducible in hydrogen and the carbonate or hydroxide of at least one metal which is non reducible in hydrogen in a fluid bed. Residual volatiles are then removed from the resulting fine particle agglomerates of metal oxides under conditions which prevent grain growth. After pelleting the composite material is treated with hydrogen at relatively low temperatures to reduce one or more of the oxides to its metal which remains dispersed in the remaining oxide or oxides. The catalyst thus formed has a large effective surface area and remains effective over a prolonged period of time.

---

This invention relates to a method of making catalyst and more particularly to heterogenous mixed oxide catalysts wherein the active metal is dispersed with a metal oxide.

Catalysts of this type are typically mixtures of the oxides of a hydrogen reducible metal such as nickel, copper or iron with the oxides of a metal such as aluminum, chromium or zinc which is not reducible in hydrogen. Subsequent to its formation, the oxide mixture is subject to a reducing atmosphere such as hydrogen gas at an elevated temperature, and the nickel copper or iron oxide is reduced while the unreduced oxide of aluminum, chromium or zinc remains dispersed throughout. Catalysts of this type are exemplified by, but not limited to, 30% CuO/70% ZnO, 20% NiO/80% $Al_2O_3$, 50% CuO/50% $Cr_2O_3$. It is also possible to have three metal oxides present as exemplified by a mixture of CuO/ZnO/$Al_2O_3$, the copper oxide being subsequently reduced to metallic copper.

These heterogenous catalysts have found wide use in such chemical processes as the liquid phase hydrogenation of carbonyls to alcohols, ammonia and methanol syntheses, high- and low-temperature shift reactions, reduction of nitrocompounds to amines, saturation of double and triple bonds, steam reforming of light hydrocarbons and methanation of CO and $CO_2$.

The prior art method for forming the mixed oxides used in making the catalyst involves the precipitation of the desired mixed oxides from a nitrate solution. In the related art of forming composite materials (typically a dispersion-hardened metal, an alloy or a cermet) a method has been disclosed in which the metals are dissolved in a strong mineral acid, suitable organic acids, or a base such as ammonium hydroxide and the solution introduced into a fluidized bed in which the bed particles are maintained at a sufficiently high temperature to substantially instantaneously and completely dehydrate and decompose the solution into a chemically homogeneous composite of the metal oxides. (See U.S. Pat. 3,305,349.) In another method for forming composite materials, a solution of the metals is made in nitric acid, sulfuric acid, ammonia or water and the solution is subjected to quick drying and then the resulting material is calcined at a temperature above the decomposition temperature of the residual materials. (See U.S. Pats. 2,893,859 and 3,070,436.)

In order for the heterogenous catalyst of the type described to function effectively it appears necessary for the metal, which is dispersed through the oxide, to present a domain of a high specific surface energy. This in turn results from providing a high surface area of the metal catalyst. According to this hypothesis of catalytic behavior, the unreduced matrix oxide serves as a carrier to prevent the sintering of the reduced metal components and to enhance retention of their chemical activity. Sintering causes domain growth of the reduced metal component and results in lowered surface area and loss in activity. Chemical modification may occur by reaction of the metal component with the feed stock and hence also a loss in catalytic activity.

The prior art of catalyst formation and the related art of composite material formation produce catalysts of the type described, but the resulting catalysts apparently do not represent the optimum combination of desired properties, i.e., the approach or attainment of molecular dispersion, the achievement of a domain of high-specific surface energy, the minimization of grain growth during catalyst formation and use and the prevention or minimimization of any chemical modifications of the catalyst components during formation and use. The method of forming composite materials as taught in U.S. Pat. 3,305,349 achieves near molecular dispersion but apparently grain growth takes place at the temperatures used in the fluid bed to achieve essentially complete, instantaneous simultaneous decomposition and dehydration. The methods of U.S. Pats. 2,893,859 and 3,070,436 require a two-step heating process which apparently gives rise to something less than the desired degree of dispersion; and the necessity for calcining the quick-dried material appears to give rise to grain growth at the elevated temperatures used.

It would therefore be desirable to have a method for making mixed oxide heterogenous catalysts with improved properties as far as effectiveness and useful life are concerned.

It is therefore a primary object of this invention to provide an improved method for making mixed oxide heterogenous catalysts. Another object is to provide a method of the character described which forms a heterogeneous catalyst in which the dispersion of the oxide component throughout the metal component approaches a molecular dispersion and in which the metal component has a domain of high specific surface energy. It is yet a further object of this invention to provide a method for forming this type of catalyst with a minimum of metal grain growth and chemical modification. Other objects of the invention will in part be obvious and will in part be apparent hereinafter.

The invention accordingly comprises the several steps and the relation of one or more of such steps with respect to each of the others thereof, which will be exemplified in the method hereinafter disclosed, and the scope of the invention will be indicated in the claims.

In brief, the process of this invention comprises the decomposing and partially dehydrating of an ammoniacal solution of a mixture of ammonium hydroxide-soluble compounds of the metals used in forming the catalyst. These compounds will be either the carbonate or hydroxide of the metal. One or more metals are chosen from nickel, copper, iron, cobalt, molybdenum, tungsten, silver or rhenium and combined with one or more metals chosen from aluminum, chromium, zinc, titanium, zirconium or silicon. The decomposition and partial dehydration is carried out in a fluid bed and then the fluid bed product is heated to remove any residual volatiles and complete the drying under conditions which prevent any appreciable grain growth in the metal oxide composite. The metal oxide composite is then compacted using, if necessary, a suitable binder. Finally, the compacted metal oxide composite is treated to reduce one or more of the metals and to leave the remaining metal oxide or oxides dispersed therethrough.

In the preparation of the ammoniacal solution which is to be introduced as an atomized liquid into the fluidized bed, it is necessary to use either the freshly precipitated hydroxide or the carbonate of the metal. It has not been found satisfactory to use those salts which are generally employed in making composite materials. In particular, the nitrates and sulfates appear to be undesirable. It may be postulated that when the nitrates are decomposed and dehydrated in the fluid bed, they pass through a liquid or a plastic state which gives rise to the eventual production of metal domains having relatively large dimensions which give rise to lower specific surface energy and hence to lower activity and less resistance to degradation during use. Sulfates are not satisfactory for forming the feed solutions because of the possibility of retaining small amounts of sulfur compounds in the catalyst. Sulfur is a known poison for this type of catalyst used in the chemical processes discussed.

The metal hydroxides and/or carbonates which are to be used in the preparation of the fluidized bed feed solution are dissolved in aqueous ammonia in concentrations up to their saturation levels. The quantities of the compounds used are those which are calculated to give the desired weight ratios of the oxides in the fluidized bed product. It is generally preferable to form the ammoniacal solutions in concentrations which approach saturation, although this is not necessary.

The liquid ammoniacal feed solution is then introduced in the form of atomized droplets below the surface of the fluidized bed particles. The use of a fluidized bed is a well developed technique and is described in such texts as "Fluidization" by Max Leva, McGraw-Hill Book Company, Inc., New York (1959) and "Fluidization and Fluid-Particle Systems" by Frederick A. Zenz and Donald F. Othmer, Reinhold Publishing Corporation, New York (1960). Because it is a well-known technique, the fluid bed will not be described in detail. However, the operating conditions as they pertain to the practice of this invention will be described.

Although any suitable inert material may be used for bed particles, the preferred particles in the method of this invention are alumina particles sized to all pass a standard U.S. 20-mesh screen and to all be retained on a standard U.S. 100-mesh screen. The bed particles are heated to a temperature ranging between about 150 to 950° C., with from 150 to 300° C. being preferred, by an inert gas flowing upwardly through the bed particles at a velocity which is typically about three feet per second. This fluidizing gas is conveniently comprised of the combustion products of a fuel such as natural gas and air. Since the fluidized bed product is to contain some water, the operational parameters of the fluidized bed (particle temperature, gas flow rate, solution feed rate, degree of atomization etc.) along with the chemical composition of the feed solution must be adjusted and controlled to produce a free-flowing bed product which may have a substantial volatiles content e.g., as much as 70% by weight if the decomposition process results in retention of high molecular weight anionic species, as well as water, in association with the composite metal oxides.

The fluidized bed product (mixed oxides with residual volatiles) is an agglomerated material wherein agglomerates ranging in size from about 1 to about 50 microns are formed of individual fine particles ranging in size from about 0.1 to 2 microns. The product is removed from the fluidized bed with the off-gases and is separated from the off-gases in any suitable device such as a cyclone separator. The fluidized bed product is a free flowing material and that which has a residual volatiles content within the upper range specified may be damp to the touch.

It is then necessary to remove the residual volatiles without inducing any appreciable grain growth of the oxides present in the oxide composite which is the product of the fluidized bed. This is accomplished by maintaining the temperature at which this step is performed below 500° C., and preferably as low as possible. In order to minimize grain growth it may be desirable to perform this step of residual volatiles removal at reduced pressures, e.g., in a vacuum at temperatures below 100° C. It is postulated that by restricting grain growth at this stage of catalyst formation, the surface area of the finally active reduced metal is maintained at a maximum and hence the active reduced metal has a domain of high specific energy, the domain size being maintained within a relatively small range. To state this postulation in another way it may be assumed that at these low temperatures, only a minimum amount of sintering and/or chemical modification takes place.

Removal of the residual volatiles may be done by heating in a hot-air oven, in a kiln, a second fluidized bed, in a vacuum system or any other apparatus suitable for this purpose. It will generally not be desirable to maintain the oxide composites at elevated temperatures for any longer period than that required to remove all of the volatiles.

The oxide composite particles, after the residual volatiles are removed, are then mixed with about 5–40% by weight of water as a binder and are pelleted. The amount of binder depends upon the particle characteristics, and generally from 10 to 15% is preferred. Pelleting may be accomplished at pressures ranging between 1,000 and 40,000 p.s.i., preferably between 2,000 and 5,000 p.s.i. These pellets may then be crushed through a screen of suitable mesh size. Although water is the preferred binder, any other binder which will not contaminate the catalyst formed may be used.

The crushed pelletized material is then subjected to a reducing atmosphere, e.g., hydrogen, at an elevated temperature to reduce at least one of the oxides to its elemental state. The temperature during this reduction step should not be greater than that temperature at which appreciable domain growth or sintering occurs leading to loss of surface area and surface activity. As an example, in the case of copper the reduction temperature should not exceed 200° C. The remaining oxide, or oxides, remains dispersed with the elemental metal providing the active catalytic surfaces.

The following example, which is meant to be illustrative and not limiting, is given further to described the method of this invention.

A feed solution was prepared by dissolving 1 kilogram of commercial grade copper carbonate in 30 liters of ammonium hydroxide (35% concentration) and 20 liters of deionized water and 1 kilogram of reagent grade zinc carbonate in like amounts of ammonium hydroxide and water, and then mixing sufficient quantities of the copper solution and zinc solution to give a mixed solution calculated to produce a composite oxide of 30% CuO and 70% ZnO by weight. This mixed feed solution at ambient temperature was then pumped under 85 pounds of pressure to a nozzle located about 17 inches above the deck plate of a pilot plant fluidized bed. This fluidized bed was a 6-inch unit, 9 feet high and it was coupled to a refractory-lined combustion chamber and a high-velocity burner operating on natural gas and compressed air. The height of the fluidized bed was about 41 inches.

Heat was supplied to the bed using combustion gases at about 880° C. as the fluidizing gas. In this mode of operation the average bed temperature was about 350° C. A superficial fluidizing velocity was maintained constant at a nominal 3 feet per second.

The fluidized bed particles were abrasive grain alumina that had been preconditioned in a previous run with a coating of copper oxide/zinc oxide. The solution feed rate under steady state conditions was maintained at about 7.6 liters per hour. The product was carried out of the bed in the off-gases and collected in an overhead cyclone separator. The product had a greenish-blue tinge indicating the presence of the water. It was free-flowing and had a bulk density of less than one gram/cc.

The fluidized bed product material was then dried in an electric oven at a temperature of about 180° C. for 4 hours to remove all the residual volatiles. To the resulting CuO/ZnO composite material was added water in an amount equal to 10% by weight of the solid. One and one-eighth inch diameter pellets were made from this solid material containing the water binder by pressing in a hydraulic press at 2,000 p.s.i. The pellets were dried at 300° C. to remove the water binder and then crushed through an 8-mesh screen. Crushing, may of course, be done before drying.

The surface area of samples of these pellets was determined by BET measurement and found to be 20.8 square meters per gram. When a solution of copper and zinc nitrates was processed in the manner described in U.S. Pat. 3,305,349 to produce the same zinc oxide/copper oxide composite the surface area was 2.3 square meters per gram.

The crushed catalyst was then subjected to hydrogen gas at 200–250° C. to reduce the copper $$CuO/ZnO + H_2 \rightarrow Cu/ZnO + H_2O$$

care being taken to effect the reduction gradually in accordance with known procedures to avoid the exothermic reaction from overheating of the catalyst. This was done by introducing 10 cc. (tap volume) of the oxide composite in a reactor which was a stoppered quartz tube surrounded, except at each end, with an electric resistance furnace. The reactor was closed and then swept with a stream of nitrogen for 10 to 20 minutes. Then with a nitrogen flow of about 0.5 cubic foot per hour and hydrogen flow of 5 to 10 cc. per minute the temperature in the reactor was increased at a rate of about 25° C./15 minutes. When the temperature reached 100° C. the hydrogen flow rate was increased to 20 cc. per minute and the nitrogen flow rate was reduced to 0.3 cubic foot per hour. When the temperature reached 200° C. the nitrogen flow rate was further reduced to 0.2 cubic foot per hour while the hydrogen flow rate was maintained constant. These conditions were maintained for 4 hours.

The same reaction containing the catalyst was then used immediately to catalyst the conversion of acetone to isopropyl alcohol by hydrogen reduction according to the reaction

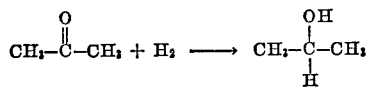

The reaction was carried out at 200° C. and atmospheric pressure. Acetone was delivered to the reactor by bubbling the hydrogen and nitrogen gases through an acetone bubbler cooled by ice water, and the product material was delivered to a condenser cooled by circulating acetone from a Dry Ice/acetone supply around the condenser. Valving was provided to permit controlling the rate of flow of all of the fluids involved.

To begin, the furnace was brought up to temperature by beginning with nitrogen flow at 0.2 cubic foot per hour and hydrogen at 20 cc. per minute. As the temperature approached 100° C. the hydrogen flow was increased to 40 cc. per minute and when it approached 150° C. the gases were allowed to bubble through the acetone, the temperature of which remained at 0° C. during the reaction. Then the hydrogen flow was increased to 360 cc. per minute and the nitrogen flow was slowly cut back to zero. The reactor temperature was maintained between 200 and 205° C. The product samples which were analyzed were those which were collected after at least one hour of reaction time. It was determined that when reaction conditions were stabilized, 3.5 grams per hour of acetone was carried into the reactor and that the volume ratio of acetone to hydrogen was 1/16. Based upon the catalyst volume, the space velocity was 2300/hour while the reactant weight/catalyst weight ratio was 0.35/hour.

A commercially available catalyst having a surface area of 37.0 square meters per gram and of essentially the same composition as the one prepared by this invention was employed in an identical manner. Finally the reaction was carried out as described without a catalyst.

The product material was analyzed by nuclear magnetic resonance spectra. The results of these comparison tests are tabulated below.

| Catalyst | This Example | Two Samples of commercially available— | | Blank |
| --- | --- | --- | --- | --- |
| | | First | Second | |
| Surface area, m.²/gm | 20.8 | 37.0 | 37.0 | |
| Weight of 10 cc | 9.48 | 14.65 | 12.40 | |
| Product analysis; percent: | | | | |
| CH₃—CO—CH₃ (unconverted) | 21 | 18 | 20 | 97 |
| CH₃—CHOH—CH₃ (product) | 76 | 64 | 68 | 1.5 |
| By-products (unidentified) | 3 | 18 | 12 | 1.5 |
| Weight space velocity, per hour | 0.37 | 0.24 | 0.36 | |
| Volume space velocity, per hour | 2,300 | 2,300 | 2,300 | 2,300 |

Under the conditions of the test described, the catalyst prepared in accordance with the method of this invention converted a larger percentage of the acetone to isopropyl alcohol than the commercially available catalyst. This was accompanied by the production of less by-product material. The catalyst made by the method of this invention also appeared better on the basis of activity per unit volume, activity per unit weight, activity per surface area and selectivity.

In a similar manner it is possible to form composites containing one or more oxides of iron, nickel, cobalt, molybdenum, tungsten, silver or rhenium as the hydrogen reducible oxide or oxides and one or more oxides of aluminum, chromium, zinc or silicon as the oxide or oxides not reducible in hydrogen. The ratios of the oxides in the composite materials may vary over relatively wide ranges. For example in a CuO/Zn composite the CuO may be present from 20 to 40 and the ZnO from 80 to 60 parts by weight; in a NiO/Al₂O₃ composite the NiO from 10 to 30 and the Al₂O₃ from 90 to 70 parts by weight; in a CuO/Cr₂O₃ composite the CuO from 40 to 60 and the Cr₂O₃ from 60 to 40 parts by weight; and in a CuO/ZnO/Al₂O₃ composite the CuO from 20 to 40, the ZnO from 80 to 60 and the Al₂O₃ from 5 to 15 parts by weight.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

We claim:

1. A method of forming a composite of metal oxides suitable for reduction to form a heterogenous catalyst, comprising the steps of
   (a) essentially decomposing and partially dehydrating an ammoniacal solution of a mixture of the carbonate or hydroxide of at least one metal selected from the group consisting of nickel, copper, iron, cobalt, molybdenum, tungsten, silver and rhenium and the carbonate or hydroxide of at least one metal selected from the group consisting of aluminum, chromium, zinc, titanium, zirconium and silicon in a fluidized bed of inert particles in which said bed particles are maintained at a temperature between about 150° C. and 950° C., thereby to form solid product in the form of agglomerates of fine grained particles which is a mixture of the oxides of the metals and which contains up to 70% by weight of residual volatiles;

(b) withdrawing said solid product from the bed particles of said fluidized bed; and (c) removing said residual volatiles form said solid product at a temperature below 500° C. and under conditions which prevent any appreciable grain growth, sintering or chemical modification thereby to form a composite of metal oxides.

2. A method in accordance with claim 1 including the step of adding between about 5 and 40% of water by weight of composite to said composite of metal oxides, pelletizing the resulting mixture under pressure and then removing said water by heating.

3. A method in accordance with claim 2 including the step of crushing the dried pelletized material.

4. A method in accordance with claim 1 wherein the agglomerates of said solid product range in size from about 1 to 50 microns and said fine grained particles forming said agglomerates range in size from about 0.1 to 2 microns.

5. A method in accordance with claim 1 wherein said ammoniacal solution is made by dissolving copper carbonate and zinc carbonate in aqueous ammonium hydroxide.

6. A method in accordance with claim 5 wherein said copper carbonate and zinc carbonate are present in said solution in a ratio to produce a composite metal oxide which ranges from 20 to 40 parts by weight CuO and 80 to 60 parts by weight ZnO.

7. A method in accordance with claim 5 wherein said copper carbonate and zinc carbonate are present in said solution in a stoichiometric ratio to produce a composite metal oxide which is approximately 30% by weight CuO and 70% by weight ZnO.

8. A method in accordance with claim 1 wherein said ammoniacal solution is made by dissolving nickel carbonate and aluminum hydroxide in aqueous ammonium hydroxide.

9. A method in accordance with claim 8 wherein said nickel carbonate and aluminum hydroxide are present in said solution in a ratio to produce a composite metal oxide which ranges from 10 to 30 parts by weight of NiO and 90 to 70 parts by weight $Al_2O_3$.

10. A method in accordance with claim 8 wherein said nickel carbonate and aluminum hydroxide are present in said solution in a stoichiometric ratio to produce a composite metal oxide which is approximately 20% by weight NiO and 80% by weight $Al_2O_3$.

11. A method in accordance with claim 1 wherein said ammoniacal solution is made by dissolving copper carbonate and chromium hydroxide in aqueous ammonium hydroxide.

12. A method in accordance with claim 11 wherein said copper carbonate and chromium hydroxide are present in said solution in a ratio to produce a composite metal oxide which ranges from 40 to 60 parts by weight CuO and 60 to 40 parts by weight $Cr_2O_3$.

13. A method in accordance with claim 11 wherein said copper carbonate and chromium hydroxide are present in said solution in a stoichiometric ratio to produce a composite metal oxide which is approximately 50% by weight CuO and 50% by weight $Cr_2O_3$.

14. A method in accordance with claim 1 wherein said ammoniacal solution is made by dissolving copper carbonate, zinc carbonate and aluminum hydorxide in aqueous ammonium hydroxide.

15. A method in accordance with claim 14 wherein said copper carbonate, zinc carbonate and aluminum hydroxide are present in said solution in a ratio to produce a composite metal oxide which ranges from 20 to 40 parts by weight CuO, 80 to 60 parts by weight ZnO and 5 to 15 parts by weight $Al_2O_3$.

16. A method in accordance with claim 14 wherein said copper carbonate, zinc carbonate and aluminum hydroxide are present in said solution in a stoichiometric ratio to produce a composite metal oxide which is approximately 28% by weight CuO, 63% by weight ZnO and 9% by weight $Al_2O_3$.

17. A method in accordance with claim 1 wherein the step of removing said residual volatiles is carried out at a pressure below atmospheric.

18. A method of forming a mixed oxide heterogenous catalyst, comprising the steps of (a) essentially decomposing and partially dehydrating an ammoniacal solution of a mixture of the carbonate or hydroxide of at least one metal which is reducible in hydrogen and is selected from the group consisting of nickel, copper, iron, cobalt, molybdenum, tungsten, silver and rhenium and the carbonate or hydroxide of at least one metal which is nonreducible in hydrogen and is selected from the group consisting of aluminum, chromium, zinc, titanium, zirconium and silicon in a fluidized bed of inert particles in which said bed particles are maintained at a temperature between about 150° C. and 950° C., thereby to form solid product in the form of agglomerates of fine grained particles which is a mixture of the oxides of the metals and which contains up to 70% by weight of residual volatiles;

(b) withdrawing said solid product from the bed particles of said fluidized bed;

(c) removing said residual volatiles from said solid product at a temperature below 500° C. and under conditions which prevent any appreciable grain growth, sintering or chemical modification thereby to form a composite of metal oxides; and (d) reducing the oxide of the hydrogen reducible metal to the metallic state at a temperature below that at which any appreciable domain growth or sintering of the reduced metal occurs.

References Cited

UNITED STATES PATENTS

| | | | |
|---|---|---|---|
| 2,865,868 | 12/1958 | McKinley | 252—467 |
| 3,615,217 | 10/1971 | O'Brien | 23—213 |

FOREIGN PATENTS

| | | | |
|---|---|---|---|
| 926,235 | 8/1960 | Great Britain | 252—475 |

DANIEL E. WYMAN, Primary Examiner

W. J. SHINE, Assistant Examiner

U.S. Cl. X.R.

252—466 J, 467, 475, 476